(12) United States Patent
Choi et al.

(10) Patent No.: US 10,026,205 B2
(45) Date of Patent: Jul. 17, 2018

(54) METHOD AND APPARATUS FOR PROVIDING PREVIEW IMAGE

(71) Applicant: SAMSUNG ELECTRONICS CO., LTD., Suwon-si (KR)

(72) Inventors: Kwang-pyo Choi, Anyang-si (KR); Young-o Park, Seoul (KR); Chan-yul Kim, Bucheon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 83 days.

(21) Appl. No.: 14/824,216

(22) Filed: Aug. 12, 2015

(65) Prior Publication Data

US 2016/0063723 A1    Mar. 3, 2016

(30) Foreign Application Priority Data

Aug. 26, 2014 (KR) .................. 10-2014-0111627

(51) Int. Cl.
| | |
|---|---|
| *G06K 9/20* | (2006.01) |
| *G06T 11/60* | (2006.01) |
| *H04N 19/00* | (2014.01) |
| *G06K 9/48* | (2006.01) |
| *G06T 9/20* | (2006.01) |
| *H04N 19/115* | (2014.01) |
| *H04N 19/162* | (2014.01) |
| *H04N 19/17* | (2014.01) |
| *H04N 19/20* | (2014.01) |
| *H04N 19/164* | (2014.01) |

(52) U.S. Cl.
CPC .............. *G06T 11/60* (2013.01); *G06K 9/481* (2013.01); *G06T 9/20* (2013.01); *H04N 19/00* (2013.01); *H04N 19/115* (2014.11); *H04N 19/162* (2014.11); *H04N 19/17* (2014.11); *H04N 19/20* (2014.11); *H04N 19/164* (2014.11)

(58) Field of Classification Search
CPC ....... G06T 3/4038; G06T 11/60; G06T 5/001; G06T 5/50; G06T 3/40; G06T 5/002; H04N 1/3876; H04N 5/23238; H04N 1/3872; H04N 1/3875; H04N 1/387; G06K 2009/2045; G06K 9/3233; G06K 9/4642; G06K 9/4652; G06F 3/0484; G06F 3/04842; G06F 3/0482
See application file for complete search history.

(56) References Cited

U.S. PATENT DOCUMENTS

| | | | |
|---|---|---|---|
| 6,774,905 B2 | 8/2004 | Elfving et al. | |
| 6,987,535 B1* | 1/2006 | Matsugu | ............. G06F 3/04845 |
| | | | 348/239 |
| 9,414,016 B2* | 8/2016 | Lin | ............. H04N 7/15 |
| | | | 382/115 |

(Continued)

FOREIGN PATENT DOCUMENTS

KR    10-2005-0114411 B1    12/2005

*Primary Examiner* — Duy M Dang
(74) *Attorney, Agent, or Firm* — Sughrue Mion, PLLC

(57) ABSTRACT

A method of transmitting an image is performed by a first device and includes obtaining an image including an object, obtaining, based on a preset setting condition of the first device, contour information defining a contour of the object and color information about a color of the object, and transmitting the contour information and the color information to a second device.

14 Claims, 11 Drawing Sheets

FIRST DEVICE (100)

SECOND DEVICE (200)

(56) References Cited

U.S. PATENT DOCUMENTS

| | | | |
|---|---|---|---|
| 2006/0018517 A1* | 1/2006 | Chen | G06K 9/00228 |
| | | | 382/115 |
| 2006/0274153 A1 | 12/2006 | Levien et al. | |
| 2009/0196349 A1* | 8/2009 | Park | G06T 7/194 |
| | | | 375/240.12 |
| 2010/0245582 A1 | 9/2010 | Harel | |
| 2013/0141605 A1* | 6/2013 | Kim | G06T 11/60 |
| | | | 348/222.1 |

* cited by examiner

FIRST DEVICE (100)

SECOND DEVICE (200)

IMAGE OBTAINED BY FIRST DEVICE

SECOND DEVICE (200)

METHOD AND APPARATUS FOR PROVIDING PREVIEW IMAGE

CROSS-REFERENCE TO RELATED APPLICATION

This application claims priority from Korean Patent Application No. 10-2014-0111627, filed on Aug. 26, 2014 in the Korean Intellectual Property Office, the disclosure of which is incorporated herein in its entirety by reference.

BACKGROUND

1. Field

Apparatuses and methods consistent with one or more exemplary embodiments relate to providing a preview image of an obtained image.

2. Description of the Related Art

In general, in order to transmit an image to another device, a device reduces the size of the image by compressing the image by using a codec such as H.264, and transmits the compressed image. However, according to a technique using an image codec, when the image is transmitted by using low bandwidth communication, the image may not be transmitted due to a limit in transmission capacity, or power consumption may be increased due to a large amount of data to be processed. Since an image compression technique is a procedure of compressing an image while the image quality of the original image is maintained as much as possible, the image compression technique has a compression rate limit, and if a network condition requires a higher compression rate than the limited compression rate, the image compression technique cannot be applied to the image.

A preview image is not an image that is captured and stored, and instead is shown to a user so as to let the user check a composition of an image to be captured and the existence of an object in the image. Thus, there is no need to maintain the image quality of the preview image.

Therefore, there is a demand for a technique of reducing a size of data by efficiently processing an image, and transmitting the image.

SUMMARY

One or more exemplary embodiments include a method of transmitting a preview image by using low bandwidth communication.

Additional aspects will be set forth in part in the description which follows and, in part, will be apparent from the description, or may be learned by practice of the presented exemplary embodiments.

According to an aspect of an exemplary embodiment, a method of transmitting an image, the method performed by a first device, includes operations of obtaining an image including an object; obtaining, based on a preset setting condition of the first device, contour information defining a contour of the object and color information about a color of the object; and transmitting the contour information and the color information to a second device.

The preset setting condition of the first device may include a setting condition indicating a setting of the contour information, and the setting condition indicating a setting of the contour information may indicate a contour detail level of the contour of the object in the image obtained by the first device.

The preset setting condition of the first device may include a setting condition indicating a setting of the color information, and the setting condition indicating a setting of the color information may indicate a number of colors of the object in the image obtained by the first device.

The operation of obtaining the contour information and the color information may further include an operation of converting a number of colors of the object into a preset number of colors according to the preset setting condition.

The operation of transmitting the contour information and the color information may include operations of obtaining preview information by digitizing the contour information and the color information; and transmitting the preview information to the second device.

The operation of transmitting the contour information and the color information may include operations of obtaining a preview image based on the contour information and the color information; and encoding the preview image and transmitting the encoded preview image to the second device.

The method may further include operations of receiving, from the second device, control information based on user input; and performing a preset operation corresponding to the control information, wherein the obtaining of the contour information includes obtaining the contour information based on the performed preset operation.

The method may further include operations of receiving, from the second device, mode information based on user input; and resetting the preset setting condition of the first device, according to the mode information.

The operation of obtaining the contour information and the color information may further include operations of determining a primary object from among objects included in the obtained image; and obtaining, based on the preset setting condition of the first device, contour information defining a contour of the primary object and color information about a color of the primary object.

According to another aspect of an exemplary embodiment, a first device configured to transmit an image includes an inputter configured to obtain an image including an object; a controller configured to obtain, based on a preset setting condition of the first device, contour information defining a contour of the object and color information about a color of the object; and a communicator configured to transmit the contour information and the color information to a second device.

The preset setting condition of the first device may include a setting condition indicating a setting of the contour information, and the setting condition indicating a setting of the contour information may indicate a contour detail level of the contour of the object in the image obtained by the first device.

The preset setting condition of the first device may include a setting condition indicating a setting of the color information, and the setting condition indicating a setting of the color information may indicate a number of colors of the object in the image obtained by the first device.

The controller may be configured to convert a number of colors of the object into a preset number of colors according to the preset setting condition.

The controller may be configured to obtain preview information by digitizing the contour information and the color information, and the communicator may be configured to transmit the preview information to the second device.

The controller may be configured to obtain a preview image based on the contour information and the color information; and the communicator may be configured to encode the preview image and transmit the encoded preview image to the second device.

The first device may be configured to receive, from the second device, control information based on user input, and the controller may be configured to perform a preset operation corresponding to the control information, and may be configured to obtain the contour information based on the performed preset operation.

The first device may be configured to receive, from the second device, mode information based on user input, and the controller may be configured to reset the preset setting condition of the first device, according to the mode information.

The controller may be configured to determine a primary object from among objects included in the obtained image, and may be configured to obtain, based on the preset setting condition of the first device, contour information defining a contour of the primary object and color information about a color of the primary object.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
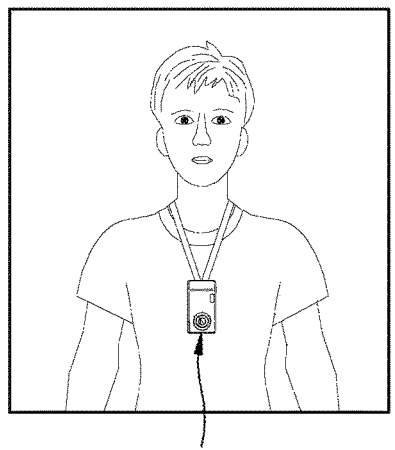
FIG. 1 illustrates an example of an operating method of a first device, according to an exemplary embodiment.
Figure 1:
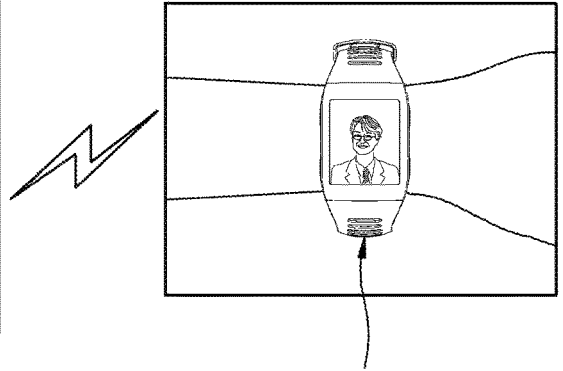

Hereinafter, the exemplary embodiments will be described in detail by explaining certain exemplary embodiments with reference to the attached drawings. The exemplary embodiments may, however, be embodied in many different forms, and should not be construed as being limited to the exemplary embodiments set forth herein; rather, these exemplary embodiments are provided so that this disclosure will be thorough and complete, and will fully convey the exemplary embodiments to those skilled in the art. In the following description, well-known functions or constructions are not described in detail since the well-known functions or constructions would obscure the exemplary embodiments with unnecessary detail, and like reference numerals in the drawings denote like or similar elements throughout the specification.

Throughout the specification, it will also be understood that when an element is referred to as being "connected to" or "coupled with" another element, the element can be directly connected to or coupled with the other element, or the element can be electrically connected to or coupled with the other element by having an intervening element interposed therebetween. Also, when a part "includes" or "comprises" an element, unless there is a particular description contrary thereto, the part can further include other elements, and does not exclude the other elements.

As used herein, the term "and/or" includes any and all combinations of one or more of the associated listed items.

Hereinafter, one or more exemplary embodiments will be described in detail with reference to the attached drawings.

FIG. 1 illustrates an example of an operating method of a first device 100, according to an exemplary embodiment.

As illustrated in FIG. 1, a user of the first device 100 may wear the first device 100. The first device 100 may be implemented as various types of devices. For example, the first device 100 may be, but is not limited to, a wearable device such as a necklace, an earring, a watch, or a smart glass, or a device such as a smartphone, a camera, or a tablet computer capable of obtaining an image.

In the present exemplary embodiment, a second device 200 may be implemented as various types of devices. For example, all devices such as computers, notebooks, mobile devices, mobile phones, tablet computers, etc., which are capable of displaying a screen, may be implemented as the second device 200, and a type of the second device 200 is not limited to any particular type of device. In the present exemplary embodiment, the first device 100 may obtain an image. The first device 100 may obtain, based on a preset setting condition of the first device 100, contour information and color information about at least one object in the obtained image. Also, the first device 100 may obtain preview information or a preview image based on the contour information and the color information. The first device 100 may transmit the preview information or the preview image to the second device 200 via a communication path.

In the present exemplary embodiment, the second device 200 may obtain the preview information or the preview image from the first device 100 via the communication path. The second device 200 may obtain the image by using the preview information or the preview image, and may display the obtained image.

Figure 2:
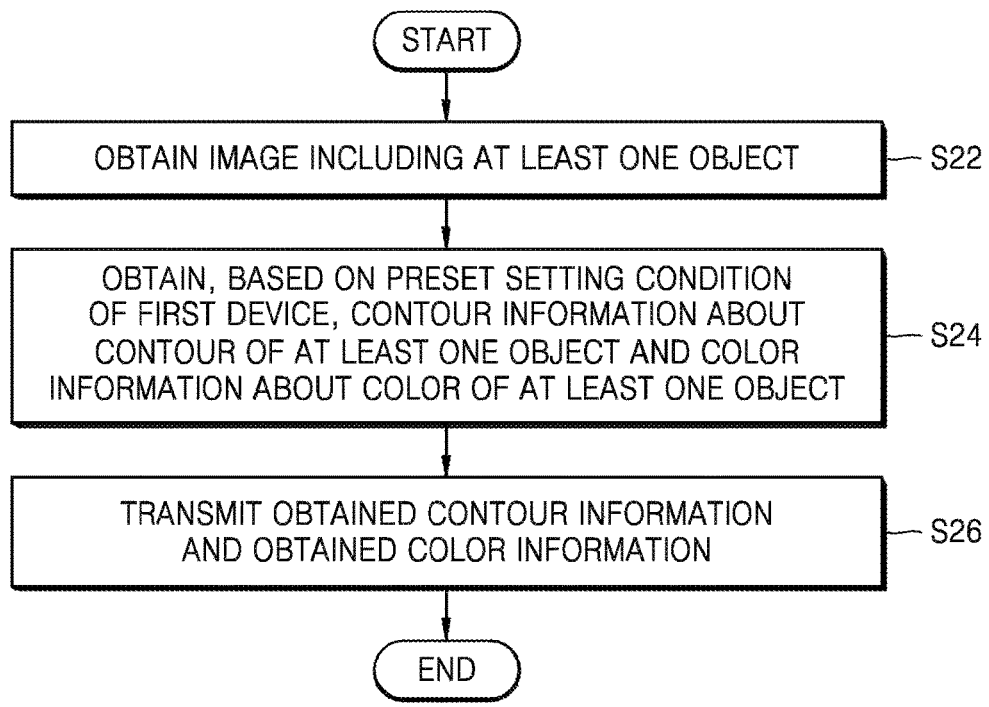
FIG. 2 illustrates a flowchart of an operating method of the first device, according to an exemplary embodiment.

FIG. 2 illustrates a flowchart of an operating method of the first device 100, according to an exemplary embodiment.

In operation S22, the first device 100 may obtain an image including at least one object.

In the present exemplary embodiment, the first device 100 may obtain, as the image, a scene around a user of the first device 100. For example, the first device 100 may obtain, as the image, a scene in front of the user of the first device 100. The image obtained by the first device 100 may include a picture (e.g., photograph) or a moving picture (e.g., video).

In the present exemplary embodiment, the first device 100 may detect the at least one object included in the obtained image. The at least one object may include, but is not limited to, a person, an electronic device, a smartphone, a wallet, a key, a tree, or a building. Of course, it is understood that the at least one object may be many other types of objects as well, including many different types of physical objects.

In operation S24, the first device 100 may obtain, based on a preset setting condition of the first device 100, contour information about a contour of the at least one object and color information about a color of the at least one object.

In the present exemplary embodiment, the setting condition of the first device 100 may include a setting condition about the contour. For example, the setting condition of the first device 100 may include, but is not limited to, a contour detail level, an expression style, a resolution, a width, or a combination thereof of the contour of the at least one object obtained by the first device 100.

In the present exemplary embodiment, the setting condition about the contour may include the contour detail level. According to an exemplary embodiment, the contour detail level refers to a value that is used to detect a contour between the at least one object and a background excluding the at least one object in the image obtained by the first device 100, and indicates a detail level of the contour obtained by the first device 100.

In the present exemplary embodiment, the contour detail level may be divided into 3 levels of '1', '2', and '3', and the first device 100 may obtain the contour information about the at least one object, based on a preset contour detail level. Of course, more or less than three levels may be used according to other exemplary embodiments.

For example, in a case where the contour detail level is divided into 3 levels of '1', '2', and '3', and the contour detail level is set as '1', the first device 100 may obtain a contour of an object, wherein the contour is more simple than contours of the object having contour detail levels that are set as '2' and '3'.

Also, when the contour detail level is set as '2', the first device 100 may obtain a contour of the object that is more detailed than the contour of the object having a contour level that is '1', and is more simplified than a contour of the object having a contour level that is '3'. When the contour detail level is set as '3', the first device 100 may obtain a contour of the object, wherein the contour is more detailed than contours of the object having contour detail levels that are set as '1' and '2'.

The contour detail level may be divided into 2 levels of '1' and '2'. When the contour detail level is set as '1', the first device 100 may obtain a contour of at least one object in an obtained image, wherein the contour is converted into a circle, a point, a straight line, a curved line, a polygon, or a combination thereof and thus is simplified. For example, when the obtained image includes a tree, the first device 100 may convert a contour of the tree in the obtained image into a triangle and/or a quadrangle and may obtain the converted triangle and/or the converted quadrangle.

When the contour detail level is set as '2', the first device 100 may detect a detailed contour of the least one object in the obtained image, and may obtain the detected contour. For example, when the obtained image includes a tree, the first device 100 may finely detect a boundary between the tree and a background excluding the tree in the obtained image, and may obtain, as a contour of the tree, the finely detected boundary. The contour detail level may be divided into 2 levels, 3 levels, or 4 or more levels, but a level of the contour detail level is not limited thereto.

In the present exemplary embodiment, the contour detail level may be reset by taking into account mode information received from the second device 200. For example, when the mode information transmitted from the second device 200 to the first device 100 indicates a 'mode 2' that indicates a contour detail level of '1', the first device 100 may reset the contour detail level as '1'.

In the present exemplary embodiment, the first device 100 may perform a preset operation, based on control information received from the second device 200, and may obtain contour information based on the performed operation. For example, when the first device 100 receives, from the second device 200, control information indicating a zoom-in operation or a zoom-out operation, the first device 100 may perform the zoom-in operation or the zoom-out operation and then may obtain contour information.

In the present exemplary embodiment, the first device 100 may determine at least one primary object among one or more objects in the obtained image. For example, the first device 100 may determine, as a primary object, a person included in the obtained image.

After the first device 100 determines the primary object, the first device 100 may obtain contour information about only the primary object. For example, when a tree and a person are included in the obtained image, if the primary object determined by the first device 100 is the person, the first device 100 may obtain contour information about only the person.

In the present exemplary embodiment, the setting condition of the first device 100 may include a setting condition about color information. For example, the setting condition of the first device 100 may include a setting condition about the number of colors that the first device 100 has to obtain among colors of at least one object included in the obtained image. In more detail, the first device 100 may preset, as 3, 5, or 10, the number of colors to be obtained from the obtained image. Of course, it is understood that the preset number of colors may be different than 3, 5 and 10 according to various exemplary embodiments.

In the present exemplary embodiment, the first device 100 may obtain, based on the preset number of colors, color information about colors of at least one object included in the obtained image. For example, in a case where an object in the obtained image has 10 colors, and the preset number of colors is 3, the first device 100 may obtain 3 colors among the 10 colors.

Also, the first device 100 may obtain color information of an image, based on the number of colors that is preset with respect to the image. For example, in a case where an image obtained by the first device 100 includes 10 colors, and the preset number of colors is 3, the first device 100 may obtain 3 colors among the 10 colors. Also, the first device 100 may obtain 3 colors among the 10 colors in the image and may convert the image including the 10 colors into an image including the 3 colors.

In the present exemplary embodiment, the first device 100 may convert the number of colors of at least one object included in the obtained image into the preset number of colors. For example, in a case where the preset number of colors is 3, and an object in the obtained image has 10 colors, the first device 100 may convert the object having the 10 colors in the image into an object having 3 colors, and may obtain the 3 colors. Also, the first device 100 may obtain 3 colors among the 10 colors of the object in the obtained image, and may convert the object having the 10 colors into an object having the obtained 3 colors.

Also, the first device 100 may convert the number of colors included in the obtained image into the preset number of colors. For example, in a case where the preset number of colors is 3, and an image obtained by the first device 100 includes 10 colors, the first device 100 may convert the image including the 10 colors into an image including 3 colors and may obtain the 3 colors.

In the present exemplary embodiment, the first device 100 may reset the preset number of colors, based on mode information received from the second device 200. For example, in a case where the mode information transmitted from the second device 200 to the first device 100 indicates a 'mode 2', and the number of colors indicated by the 'mode 2' is 5, the first device 100 may set, as 5, the number of colors to be obtained.

In the present exemplary embodiment, based on control information received from the second device 200, the first device 100 may perform a preset operation and may obtain color information based on the performed operation. For example, when the first device 100 receives, from the second device 200, control information indicating a zoom-in operation or a zoom-out operation, the first device 100 may perform the zoom-in operation or the zoom-out operation and then may obtain color information.

In the present exemplary embodiment, the first device 100 may determine at least one primary object from among one or more objects included in an obtained image. For example, the first device 100 may determine, as the primary object, a person included in the obtained image.

After the first device 100 determines the primary object, the first device 100 may obtain color information about only the primary object. For example, when a tree and a person exist in the image obtained by the first device 100, if the primary object determined by the first device 100 is the person, the first device 100 may obtain color information about only the person.

In operation S26, the first device 100 may transmit the obtained contour information and the obtained color information.

In the present exemplary embodiment, the first device 100 may obtain preview information by using the obtained contour information and the obtained color information. According to an exemplary embodiment, the preview information refers to data obtained by digitizing the obtained contour information and the obtained color information by using a predefined algorithm. The first device 100 may transmit the preview information to the second device 200 via a communication path.

In the present exemplary embodiment, the first device 100 may obtain a preview image by using the obtained contour information and the obtained color information. According to an exemplary embodiment, the preview image refers to an image obtained by simplifying the obtained image by using the obtained contour information and the obtained color information. The first device 100 may transmit the preview image to the second device 200 via the communication path.

The communication path may be defined as a path that is used or is usable when the first device 100 and the second device 200 perform communication. For example, the communication path may include, but is not limited to, WiFi, Worldwide Interoperability for Microwave Access (WiMAX), third-generation (3G), fourth-generation (4G), Bluetooth, or Wireless Gigabit Alliance (WiGIG).

In the present exemplary embodiment, the second device 200 may obtain an image by using the preview information and/or the preview image received from the first device 100, and may display the obtained image.

Figure 3:
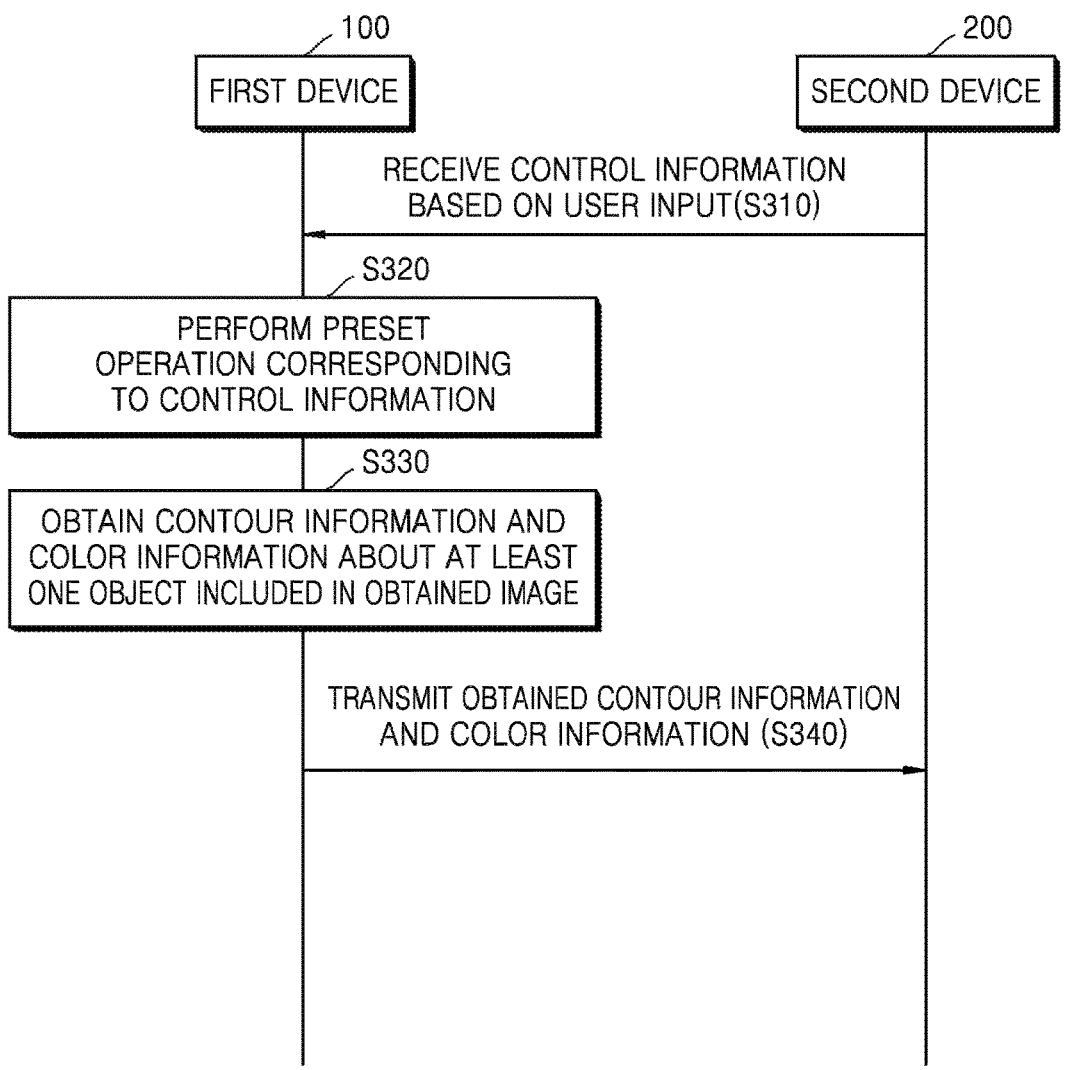
FIG. 3 illustrates a flowchart of a method of operating the first device by receiving control information from a second device, according to an exemplary embodiment.

FIG. 3 illustrates a flowchart of a method of operating the first device 100 by receiving control information from the second device 200, according to an exemplary embodiment.

In operation S310, the first device 100 may receive, from the second device 200, the control information based on a user input.

The control information refers to a command transmitted from the second device 200 to the first device 100 to make the first device 100 perform a preset operation, based on the user input. The control information may indicate, but is not limited to indicating, a zoom-in operation, a zoom-out operation, a light-on operation, a light-off operation, a video mode operation, and a combination thereof.

The first device 100 may receive the control information from the second device 200, and a user may input the control information by using the second device 200. The first device 100 may receive the control information from the second device 200 via a communication path. The communication path may include, but is not limited to, WiFi, WiMAX, 3G, 4G, Bluetooth, or WiGIG.

In operation S320, the first device 100 may perform the preset operation corresponding to the control information received from the second device 200. For example, when the first device 100 receives, from the second device 200, control information indicating the zoom-in operation based on a user input, the first device 100 may perform the zoom-in operation by adjusting a focus of a camera of the first device 100. Also, when the first device 100 receives, from the second device 200, control information indicating the light-on operation based on a user input, the first device 100 may perform the light-on operation by turning on a light source included in the first device 100.

In operation S330, after the first device 100 performs the preset operation corresponding to the received control information, the first device 100 may obtain contour information and color information about at least one object included in an obtained image. The obtainment is described above with reference to operation S24 in the flowchart of FIG. 2.

In operation S340, the first device 100 may transmit the obtained contour information and the obtained color information, and the transmission is described above with reference to operation S26 in the flowchart of FIG. 2.

Figure 4:
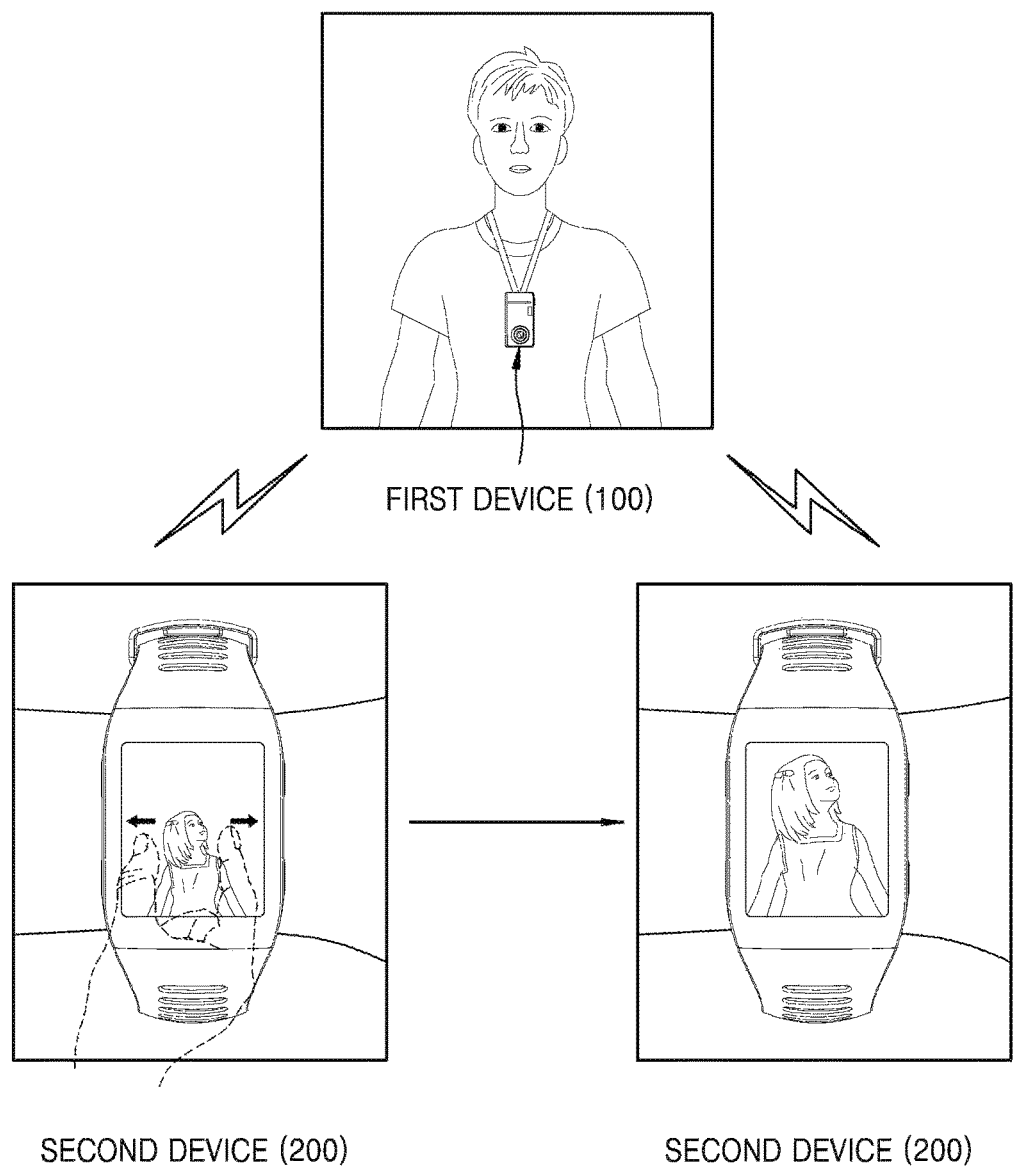
FIG. 4 illustrates an example in which the first device receives control information from the second device and operates based on the control information, according to an exemplary embodiment.

FIG. 4 illustrates an example in which the first device 100 receives control information from the second device 200 and operates based on the control information, according to an exemplary embodiment.

Referring to FIG. 4, the second device 200 may generate the control information based on a user input, and may transmit the generated control information to the first device 100. For example, a user may input a command indicating a zoom-in operation, via a touch sensor of the second device 200, and the second device 200 may obtain the control information based on the user input and may transmit the obtained control information to the first device 100.

The first device 100 may perform a preset operation, based on the received control information. For example, the first device 100 may perform the zoom-in operation indicated by the control information received from the second device 200. After the first device 100 performs the zoom-in operation, the first device 100 may obtain contour information and color information about at least one object included in an obtained image and may transmit the contour information and the color information to the second device 200.

Figure 5:
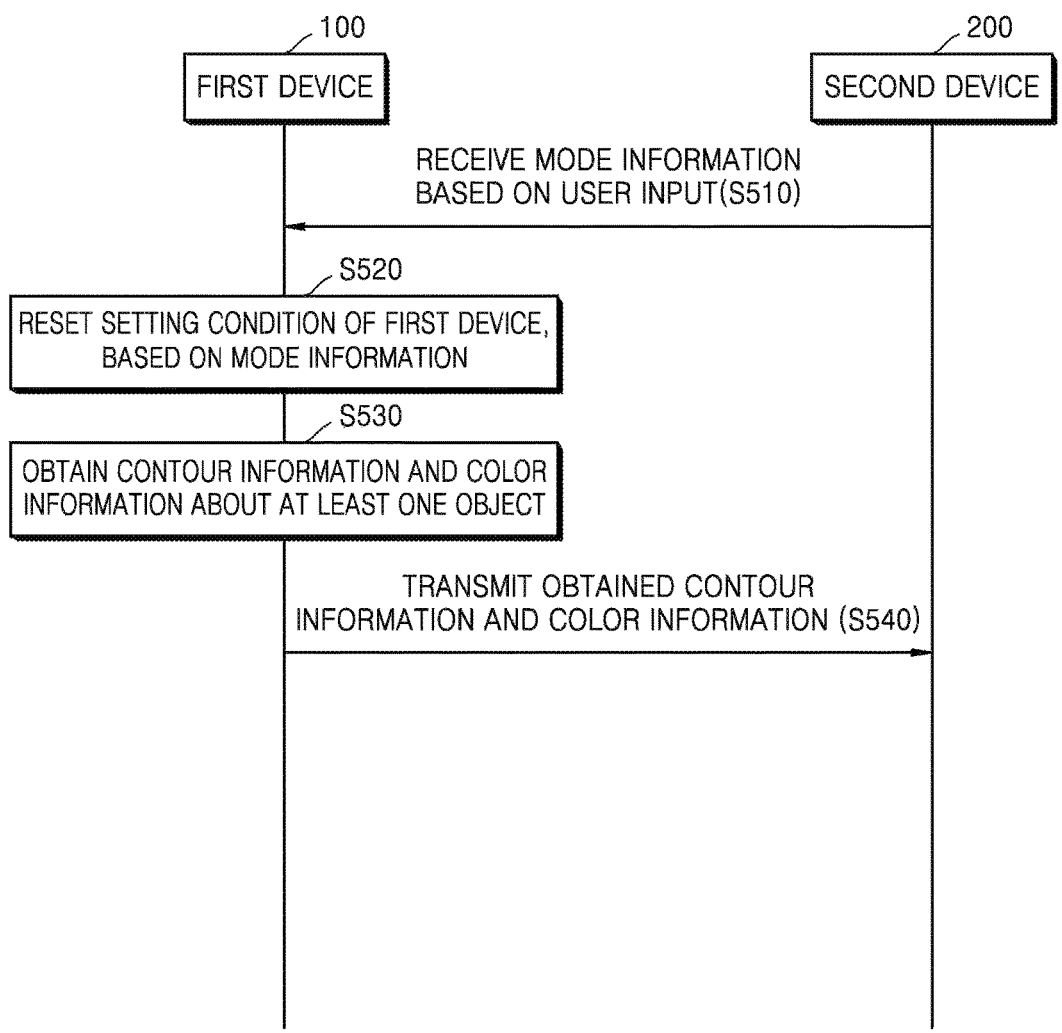
FIG. 5 illustrates a flowchart of a method of operating the second device by receiving mode information from the second device, according to an exemplary embodiment.

FIG. 5 illustrates a flowchart of a method of operating the first device 100 by receiving mode information from the second device 200, according to an exemplary embodiment.

In operation S510, the first device 100 may receive, from the second device 200, the mode information based on a user input.

The mode information is defined to include setting information about a contour detail level and/or the number of colors, wherein the contour detail level indicates a contour to be obtained from at least one object that is included in an image obtained by the first device 100. For example, when the mode information indicates a 'mode 1', the contour detail level may be '1', and the number of colors may be '10'.

In the present exemplary embodiment, a user may set the mode information by using the second device 200. For example, the user may set the mode information in such a manner that, in the 'mode 1', the contour detail level is '2', and the number of colors is '5'. Also, the user may set the mode information in such a manner that, in a 'mode 2', the contour detail level is '2', and the number of colors is '3'. The mode information input by the user using the second device 200 may be stored in the first device 100 and/or the second device 200.

The user may select the set mode information via the second device 200. For example, the user may select a first mode, a second mode, or the like via the second device 200. The number of modes is not limited to any particular number and may be increased or decreased according to an input by the user.

In operation S520, the first device 100 may reset a setting condition of the first device 100, based on the mode information received from the second device 200.

In the present exemplary embodiment, the first device 100 may obtain information about the setting condition of the first device 100 that is indicated by the mode information received from the second device 200. For example, the first device 100 may recognize that, in the 'mode 1', the contour detail level is '2', and the number of colors is '5'. The first device 100 may obtain, by using the mode information stored in the first device 100, the contour detail level and/or the number of colors that corresponds to the mode information received from the second device 200. Also, the mode information that is transmitted from the second device 200 to the first device 100 may include the contour detail level and/or the number of colors.

In the present exemplary embodiment, the first device 100 may change the setting condition of the first device 100, based on the contour detail level and/or the number of colors indicated by the received mode information. For example, when the 'mode 1' received by the first device 100 indicates that the contour detail level is '2' and the number of colors is '5', the first device 100 may change a value of a preset contour detail level to '2' and may change a value of the present number of colors to '5'.

In operation S530, the first device may obtain, based on the reset setting condition, contour information and color information about at least one object included in the obtained image. For example, when the contour detail level is '2' and the number of colors is '5' according to the setting condition reset by the first device 100, the first device 100 may obtain, from the obtained image, a contour of the at least one object, based on the contour detail level of '2', and may obtain, from the obtained image, the color information about the at least one object, based on the number of colors of '5'.

In operation S540, the first device 100 may transmit the obtained contour information and the obtained color information, and the transmission is described above with reference to operation S26 in the flowchart of FIG. 2.

Figure 6:
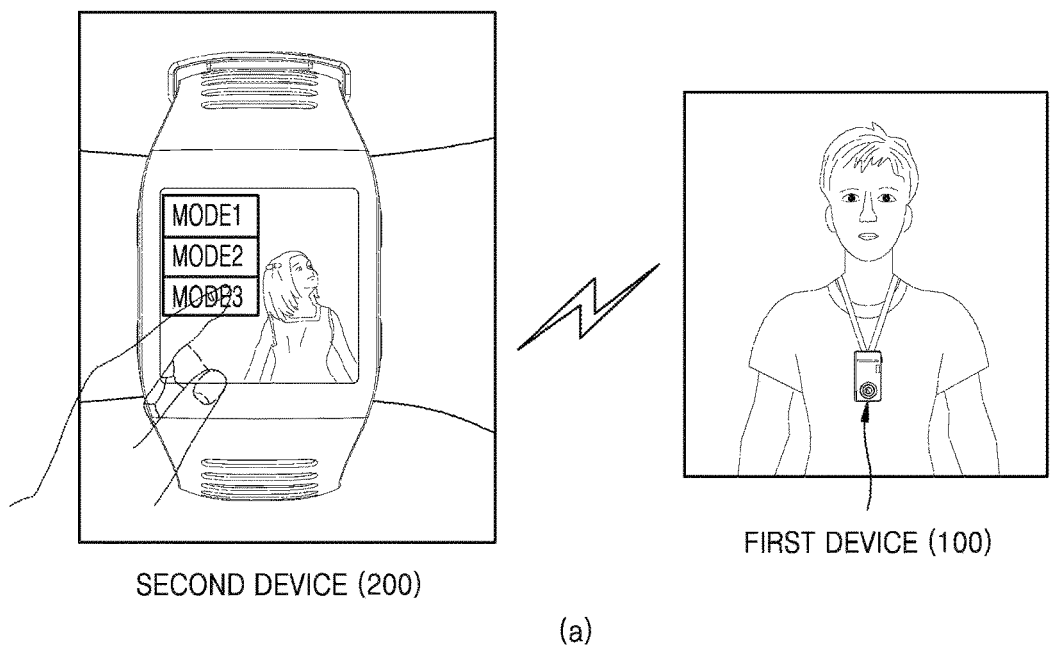
FIG. 6 illustrates an example in which the first device receives mode information and operates based on the mode information, according to an exemplary embodiment.

FIG. 6 illustrates an example in which the first device 100 receives mode information and operates based on the mode information, according to an exemplary embodiment.

Referring to (a) of FIG. 6, a user of the first device 100 may select a mode via an input unit 220 (e.g., inputter) (refer to FIG. 10) of the second device 200. The second device 200 may obtain mode information based on the selected mode, and may transmit the obtained mode information to the first device 100.

The first device 100 may reset a setting condition of the first device 100, based on the mode information received from the second device 200, and may obtain contour information, color information, or a combination thereof about an object in an image, based on the reset setting condition.

Referring to (b) of FIG. 6, an example of the mode information stored in the first device 100, the second device 200, or a combination thereof is shown.

In the present exemplary embodiment, a mode index 62 refers to a value that is displayed on a display unit 260 (e.g., display) (refer to FIG. 10) of the second device 200 and includes information about a contour detail level 64 and the number of colors 66. Referring to FIG. (b) of FIG. 6, when the mode index 62 is '1', the contour detail level 64 may indicate '2' and the number of colors 66 may indicate '1'.

A user may set, by using the second device 200, contour detail levels and the numbers of colors that correspond to mode indexes, respectively. The contour detail levels and the numbers of colors that correspond to the mode indexes, respectively, may be stored in the form of table. The contour detail levels and the numbers of colors that correspond to the mode indexes, respectively, may be stored in the first device 100 and/or the second device 200. Of course, the contour detail levels and the number of colors may also be stored in forms or formats other than a table, such as lists or other storage forms or formats known to those skilled in the art.

Figure 7A:
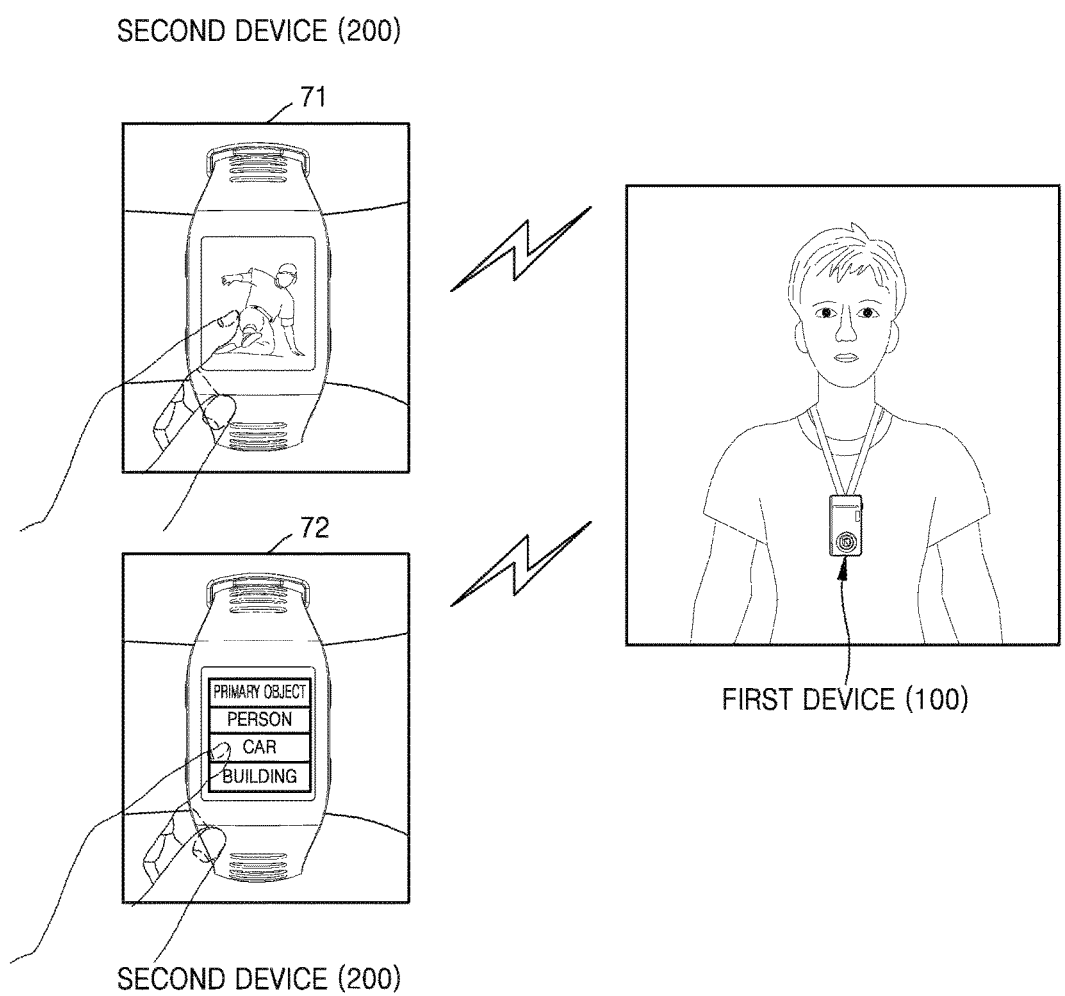
FIGS. 7A and 7B illustrate an example in which the first device determines a primary object, according to an exemplary embodiment.

FIG. 7A illustrates an example in which the first device 100 determines a primary object, according to an exemplary embodiment.

Referring to FIG. 7A, the first device 100 may determine the primary object. For example, the first device 100 may determine the primary object, based on information about the primary object that is received from the second device 200.

In the present exemplary embodiment, the second device 200 may obtain the information about the primary object, based on a user input. For example, when a user selects (see operation 71) a predetermined object as the primary object in an image displayed on the second device 200, the second device 200 may obtain primary object information indicating that the selected object is the primary object, and may transmit the primary object information to the first device 100.

The first device 100 may determine the primary object from among one or more objects included in the image, based on the received primary object information.

Also, the primary object may be preset before the first device 100 obtains the image. For example, the first device 100 may preset (see operation 72), as the primary object, a person, a car, a building, or a combination thereof, according to the primary object information that is based on the user input and is received from the second device 200, but a target of the primary object is not limited thereto. The first device 100 may recognize an object that is set as the primary object among the one or more objects in the image, and may determine the recognized object as the primary object.

Figure 7B:
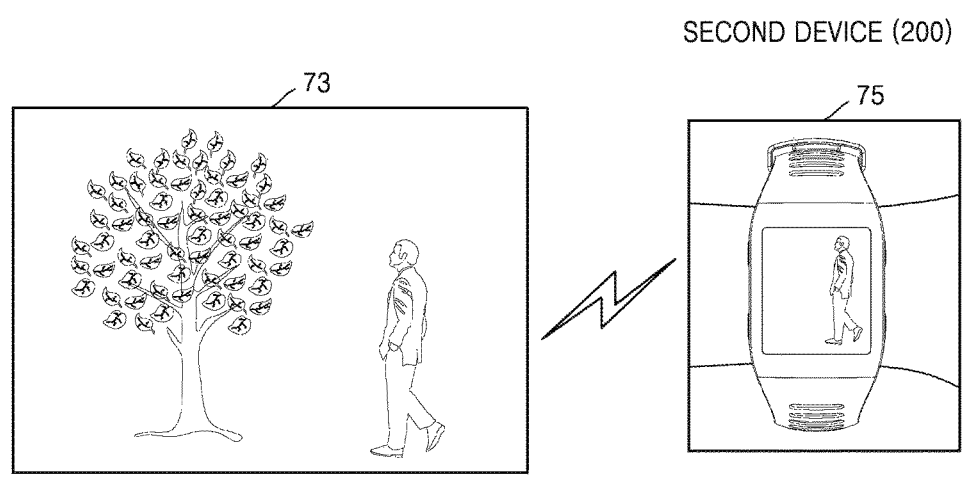

Referring to FIG. 7B, after the first device 100 determines the primary object, the first device 100 may obtain contour information about only the primary object. For example, when a tree and a person exist in an image obtained by the first device 100 (refer to reference numeral 73), if the primary object determined by the first device 100 is the person, the first device 100 may obtain contour information about only the person.

Also, after the first device 100 determines the primary object, the first device 100 may obtain color information about only the primary object. For example, when the tree and the person exist in the image obtained by the first device 100, if the primary object determined by the first device 100 is the person, the first device 100 may obtain color information about only the person.

The first device 100 may transmit the contour information and the color information about the primary object to the second device 200, and the second device 200 may obtain an image based on the contour information and the color information, and may display the obtained image (see operation 75).

In the present exemplary embodiment, when the first device 100 determines the primary object, the first device 100 may set a contour detail level with respect to the primary object, wherein the contour detail level is higher than a contour detail level that is applied to objects other than the primary object. For example, the first device 100 may detect a detailed contour of the primary object by using the set contour detail level, and may obtain the detected contour. Also, the first device 100 may obtain a contour of an object other than the primary object, wherein the contour is converted into a circle, a point, a straight line, a curved line, a polygon, or a combination thereof and thus is simplified.

For example, when the tree and the person exist in the image obtained by the first device 100, if the primary object determined by the first device 100 is the person, the first device 100 may finely detect a boundary between the person and a background excluding the person in the image, and may obtain, as a contour of the person, the finely detected boundary. For the tree that is the object other than the primary object, the first device 100 may obtain a contour of the tree that is converted into a circle, a point, a straight line, a curved line, or a combination thereof.

In the present exemplary embodiment, when the first device 100 determines the primary object, the first device 100 may set the number of colors in such a manner that the number of colors obtained from the primary object is greater than the number of colors obtained from the object other than the primary object. Also, the first device 100 may convert the primary object and the object other than the primary object, by using the obtained colors. For example, when the tree and the person exist in the image obtained by the first device 100, if the primary object determined by the first device 100 is the person, the first device 100 may obtain a greater number of colors from the person than the number of colors obtained from the tree, and may convert the person and the tree by using the obtained colors.

Figure 8:
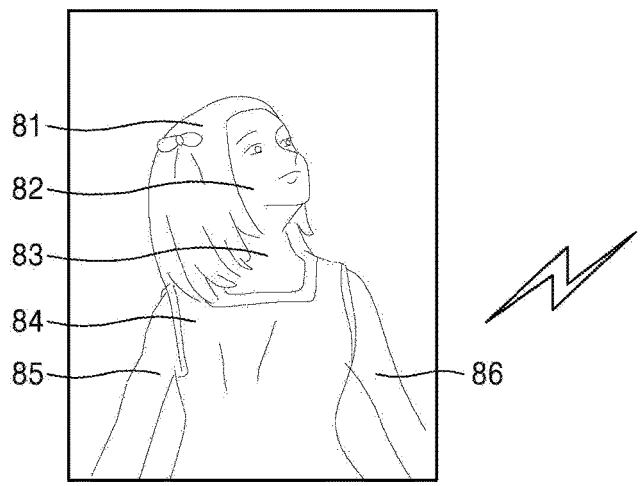
FIG. 8 illustrates an example in which the first device converts the number of colors of an object into a preset number of colors, according to an exemplary embodiment.
Figure 8:
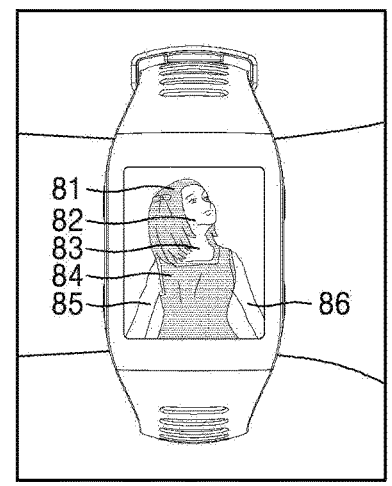

FIG. 8 illustrates an example in which the first device 100 converts the number of colors of an object into a preset number of colors, according to an exemplary embodiment.

In the present exemplary embodiment, the first device 100 may obtain colors of at least one object included in an image obtained by the first device 100. For example, if the image obtained by the first device 100 includes a person, the first device 100 may obtain colors of the person.

The first device 100 may select a preset number of colors from among a plurality of obtained colors. For example, in a case where colors of an object obtained by the first device 100 include red, green, yellow, white, black, green-blue, white-yellow, red-blue, etc., and the preset number of colors is '2', the first device 100 may select white and black from among the obtained colors. The first device 100 may select colors, based on a preset algorithm.

The first device 100 may convert the pre-obtained image, based on the selected preset number of colors. For example, the first device 100 may convert the object having the colors of red, green, yellow, white, black, green-blue, white-yellow, red-blue, etc., in the obtained image into an object having white and black colors.

In order to convert the object, the first device 100 may divide the object in the obtained image into one or more areas. For example, the first device 100 may divide an image of a person in the obtained image into a plurality of areas 81, 82, 83, 84, 85, and 86.

The first device 100 may convert the image by matching the colors, which are selected based on the preset number of colors, with the one or more divided areas, respectively. For example, the first device 100 may match a black color with the areas 81 and 84, and may match a white color with the areas 82, 83, 85, and 86.

The first device 100 may obtain color information including information about the colors selected based on the preset number of colors, information about the one or more divided areas, and information about the colors matched with the one or more divided areas, respectively, and may transmit the obtained color information to the second device 200 via a communication path.

The second device 200 may obtain an image by using the received color information, and may display the obtained image.

Figure 9:
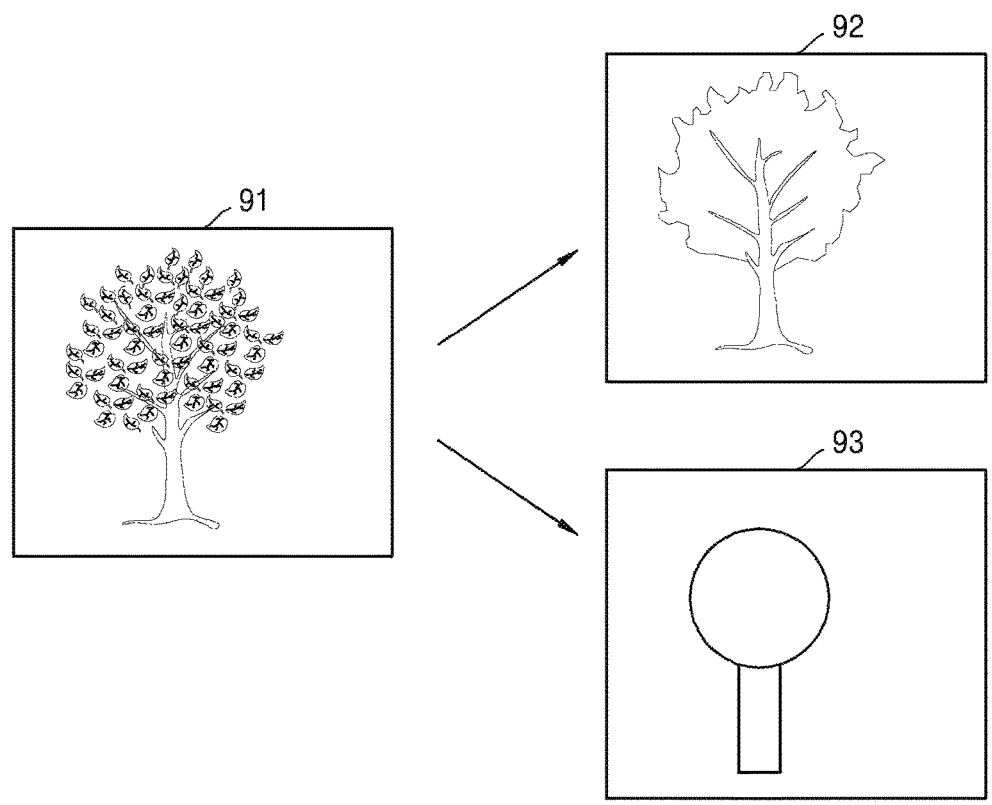
FIG. 9 illustrates an example of a method of obtaining a contour of at least one object in an obtained image, according to an exemplary embodiment.

FIG. 9 illustrates an example of a method of obtaining a contour of at least one object in an obtained image, according to an exemplary embodiment.

In the present exemplary embodiment, the first device 100 may obtain contour information about the at least one object, based on a preset contour detail level.

For example, when a contour detail level is '1', the first device 100 may obtain a contour of at least one object in an image 91, wherein the contour is converted into a circle, a point, a straight line, a curved line, a polygon, or a combination thereof. Referring to an image 93 of FIG. 9, when a tree exists in the image 91 obtained by the first device 100, the first device 100 may convert a contour of the tree in the obtained image into a quadrangle and a circle, and may obtain the converted quadrangle and circle.

Referring to an image 92 of FIG. 9, when the contour detail level is '2', the first device 100 may detect a detailed contour of at least one object in the image 91, and may obtain the detected contour. For example, when the tree exists in the image 91 obtained by the first device 100, the first device 100 may finely detect a boundary between the tree and a background excluding the tree in the image 91, and may obtain, as the contour of the tree, the finely detected boundary.

Figure 10:
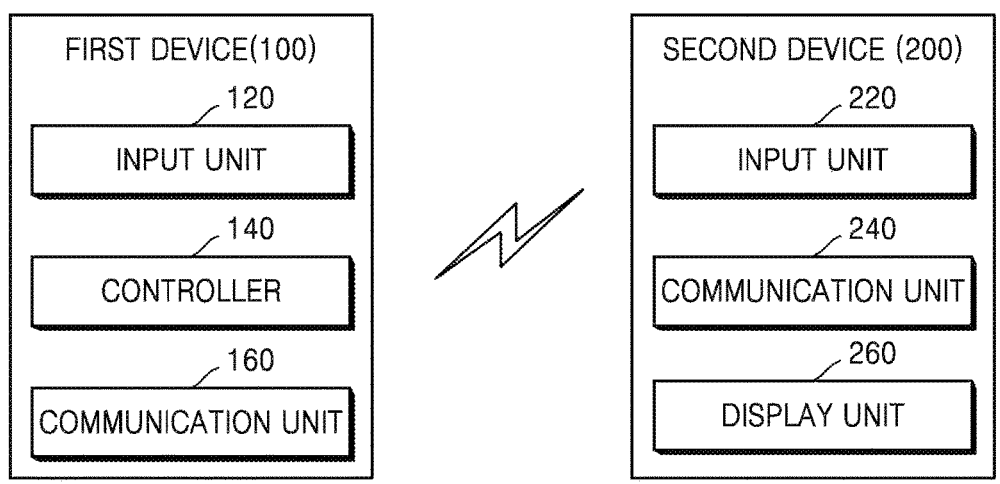
FIG. 10 is a block diagram illustrating an example of an operating method of the first device, according to an exemplary embodiment.

FIG. 10 is a block diagram illustrating an example of an operating method of the first device 100, according to an exemplary embodiment.

In the present exemplary embodiment, an input unit 120 (e.g., inputter) of the first device 100 may obtain, as an image, a scene around a user of the first device 100. For example, the input unit 120 of the first device 100 may obtain, as the image, a scene in front of the user of the first device 100. The image obtained by the input unit 120 of the first device 100 may include a picture or a moving picture.

In the present exemplary embodiment, a controller 140 of the first device 100 may detect at least one object included in the obtained image. The at least one object may include, but is not limited to, a person, an electronic device, a smartphone, a wallet, a key, a tree, a building, etc.

In the present exemplary embodiment, the controller 140 of the first device 100 may obtain, based on a preset setting condition of the first device 100, contour information about a contour of the at least one object and color information about a color of the at least one object.

In the present exemplary embodiment, the setting condition of the first device 100 may include a setting condition about the contour. For example, the setting condition of the first device 100 may include, but is not limited to, a contour detail level, an expression style, a resolution, a width, or a combination thereof of the contour of the at least one object obtained by the first device 100.

In the present exemplary embodiment, the controller 140 of the first device 100 may obtain the contour information about the at least one object, based on a preset contour detail level. For example, when the contour detail level is '1', the controller 140 of the first device 100 may obtain a contour of the at least one object in the obtained image, wherein the contour is converted into a circle, a point, a straight line, a curved line, a polygon, or a combination thereof. In more detail, when a tree exists in the image obtained by the input unit 120 of the first device 100, the first device 100 may convert a contour of the tree in the obtained image into a triangle and/or a quadrangle and may obtain the converted triangle and/or the converted quadrangle.

Also, when the contour detail level is '2', the controller 140 of the first device 100 may detect a contour of at least one object in the obtained image, and may obtain the detected contour. For example, when a tree exists in the image obtained by the input unit 120 of the first device 100, the first device 100 may detect a contour of the tree, and may obtain the detected contour.

In the present exemplary embodiment, the contour detail level may be reset according to mode information received from the second device 200. For example, when the mode information transmitted from a communication unit 240 (e.g., communicator) of the second device 200 to a communication unit 160 of the first device 100 indicates a mode 2 that indicates a 'strong' contour detail level, the controller 140 of the first device 100 may reset the contour detail level as a 'strong' level.

In the present exemplary embodiment, the controller 140 of the first device 100 may perform a preset operation, based on control information received from the communication unit 240 of the second device 200, and may obtain contour information based on the performed operation. For example, when the communication unit 160 of the first device 100 receives, from the communication unit 240 of the second device 200, control information indicating a zoom-in operation or a zoom-out operation, the first device 100 may perform the zoom-in operation or the zoom-out operation and then may obtain contour information.

In the present exemplary embodiment, the controller 140 of the first device 100 may determine at least one primary object among one or more objects in the obtained image. For example, the controller 140 of the first device 100 may determine, as a primary object, a person included in the obtained image.

After the controller 140 of the first device 100 determines the primary object, the controller 140 of the first device 100 may obtain contour information about only the primary object. For example, when a tree and the person exist in the image obtained by the input unit 120 of the first device 100, if the primary object determined by the controller 140 of the first device 100 is the person, the controller 140 of the first device 100 may obtain contour information about only the person.

In the present exemplary embodiment, the setting condition of the first device 100 may include a setting condition about color information. For example, the setting condition of the first device 100 may include a setting condition about the number of colors that the controller 140 of the first device 100 should obtain among colors of at least one object included in the obtained image. In more detail, the controller 140 of the first device 100 may preset, as '3', '5', or '10, the number of colors to be obtained from the obtained image.

In the present exemplary embodiment, the controller 140 of the first device 100 may obtain, based on the preset number of colors, color information about colors of at least one object included in the obtained image. For example, in a case where an object in the image obtained by the input unit 120 of the first device 100 has 10 colors, and the preset number of colors is 3, the controller 140 of the first device 100 may obtain 3 colors among the 10 colors.

Also, the controller 140 of the first device 100 may obtain color information of an image, based on the number of colors that is preset with respect to the image. For example, in a case where the image obtained by the input unit 120 of the first device 100 includes 10 colors, and the preset number of colors is 3, the controller 140 of the first device 100 may obtain 3 colors among the 10 colors.

In the present exemplary embodiment, the controller 140 of the first device 100 may convert the number of colors of at least one object included in the obtained image into the preset number of colors. For example, in a case where the preset number of colors is 3, and an object in the image obtained by the input unit 120 of the first device 100 has 10 colors, the controller 140 of the first device 100 may convert the object having the 10 colors in the image into an object having 3 colors, and may obtain the 3 colors.

Also, the controller 140 of the first device 100 may convert the number of colors included in the obtained image into the preset number of colors. For example, in a case where the preset number of colors is 3, and the image obtained by the input unit 120 of the first device 100 includes 10 colors, the controller 140 of the first device 100 may convert the image including the 10 colors into an image including 3 colors and may obtain the 3 colors.

In the present exemplary embodiment, the controller 140 of the first device 100 may reset the preset number of colors, based on mode information received from the communication unit 240 of the second device 200. For example, in a case where the mode information transmitted from the communication unit 240 of the second device 200 to the communication unit 160 of the first device 100 indicates a 'mode 2', and the number of colors indicated by the 'mode 2' is 5, the controller 140 of the first device 100 may set the number of colors to be obtained to be 5 colors.

In the present exemplary embodiment, based on control information received from the communication unit 240 of the second device 200, the first device 100 may perform a preset operation and may obtain color information based on the performed operation. For example, when the communication unit 160 of the first device 100 receives, from the communication unit 240 of the second device 200, control information indicating a zoom-in operation or a zoom-out operation, the first device 100 may perform the zoom-in operation or the zoom-out operation and then may obtain color information.

In the present exemplary embodiment, the controller 140 of the first device 100 may determine at least one primary object from among one or more objects included in the obtained image. For example, the controller 140 of the first device 100 may determine, as the primary object, a person included in the obtained image.

After the controller 140 of the first device 100 determines the primary object, the controller 140 of the first device 100 may obtain color information about only the primary object. For example, when a tree and a person exist in the image obtained by the input unit 120 of the first device 100, if the primary object determined by the controller 140 of the first device 100 is the person, the controller 140 of the first device 100 may obtain color information about only the person.

In the present exemplary embodiment, the controller 140 of the first device 100 may obtain preview information by using the obtained contour information and the obtained color information. According to an exemplary embodiment, the communication unit 160 (e.g., communicator) of the first device 100 may transmit the preview information to the communication unit 240 of the second device 200 via a communication path.

In the present exemplary embodiment, the controller 140 of the first device 100 may obtain a preview image by using the obtained contour information and the obtained color information. The communication unit 160 of the first device 100 may transmit the preview image to the second device 200 via the communication path.

In the present exemplary embodiment, the display unit 260 of the second device 200 may obtain an image by using the preview information and/or the preview image received from the first device 100, and may display the obtained image.

The one or more exemplary embodiments may be embodied as a recording medium, e.g., a program module to be executed in computers, which include computer-readable commands. The computer storage medium may include any usable medium that may be accessed by computers, volatile and non-volatile media, and detachable and non-detachable media. Also, the computer storage medium may include a computer storage medium and a communication medium. The computer storage medium includes many different types of volatile and non-volatile media, and detachable and non-detachable media which are designed to store information including computer readable commands, data structures, program modules or other data. The communication medium includes computer-readable commands, a data structure, a program module, and other transmission mechanisms, and includes other information transmission media as well.

The exemplary embodiments may, however, be embodied in many different forms and should not be construed as being limited to the exemplary embodiments set forth herein; rather, these exemplary embodiments are provided so that this disclosure will be thorough and complete, and will fully convey the exemplary embodiments to those of ordinary skill in the art. For example, elements that are described as being singular may be executed in a distributed fashion, and also, elements that are described as being distributed may be combined and then executed.

While one or more exemplary embodiments have been described with reference to the figures, it will be understood by those of ordinary skill in the art that various changes in form and details may be made therein without departing from the spirit and scope as defined by the following claims.

What is claimed is:

1. A method of transmitting an image, the method performed by a first device and comprising:
    obtaining an image comprising one or more objects;
    determining a primary object from among the one or more objects comprised in the obtained image;
    converting a contour of the one or more objects into a simplified representation of the contour based on a contour detail level, wherein the contour detail level indicates a precision level of a boundary between the one or more objects and a background excluding the one or more objects;
    converting a number of colors of the one or more objects into a preset number of colors based on the preset number of colors;
    obtaining contour information defining the simplified representation of the contour and color information representing colors of the one or more objects with the preset number of colors; and
    transmitting the contour information and the color information to a second device,
    wherein a contour detail level with respect to the primary object is higher than a contour detail level with respect to an object other than the primary object, and
    wherein a preset number of colors with respect to the primary object is greater than a preset number of colors with respect to the object other than the primary object.

2. The method of claim 1, wherein the transmitting of the contour information and the color information comprises:
    obtaining preview information by digitizing the contour information and the color information; and
    transmitting the preview information to the second device.

3. The method of claim 1, wherein the transmitting of the contour information and the color information comprises:
    obtaining a preview image based on the contour information and the color information; and
    encoding the preview image and transmitting the encoded preview image to the second device.

4. The method of claim 1, further comprising:
    receiving, from the second device, control information based on user input; and
    performing a preset operation corresponding to the control information,
    wherein the obtaining of the contour information comprises obtaining the contour information based on the performed preset operation.

5. The method of claim 1, further comprising:
    receiving, from the second device, mode information based on user input; and
    resetting a preset setting condition of the first device, according to the mode information,
    wherein the preset setting condition comprises the contour detail level and the preset number of colors.

6. A non-transitory computer-readable recording medium having recorded thereon a program for executing the method of claim 1, by using a computer.

7. A first device configured to transmit an image, the first device comprising:
    an inputter configured to obtain an image comprising one or more objects;
    at least one processor configured to determine a primary object from among the one or more objects comprised in the obtained image, convert a contour of the one or more objects into a simplified representation of the contour based on a contour detail level, convert a number of colors of the one or more objects into a preset number of colors, based on contour information defining the simplified representation of the contour and color information representing colors of the one or more objects with the preset number of colors; and
    a communicator configured to transmit the contour information and the color information to a second device,
    wherein the contour detail level indicates a precision level of a boundary between the one or more objects and a background excluding the one or more objects, wherein a contour detail level with respect to the primary object is higher than a contour detail level with respect to an object other than the primary object, and wherein a preset number of colors with respect to the primary object is greater than a preset number of colors with respect to the object other than the primary object.

8. The first device of claim 7, wherein the at least one processor is configured to obtain preview information by digitizing the contour information and the color information, and the communicator is configured to transmit the preview information to the second device.

9. The first device of claim 7, wherein the at least one processor is configured to obtain a preview image based on the contour information and the color information; and the communicator is configured to encode the preview image and transmit the encoded preview image to the second device.

10. The first device of claim 7, wherein the first device is configured to receive, from the second device, control information based on user input, and the at least one processor is configured to perform a preset operation corresponding to the control information, and obtain the contour information based on the performed preset operation.

11. The first device of claim 7, wherein the first device is configured to receive, from the second device, mode information based on user input, the at least one processor is configured to reset a preset setting condition of the first device, according to the mode information, and the preset setting condition comprises the contour detail level and the preset number of colors.

12. A second device configured to receive a preview image from a first device, the second device comprising:

an inputter configured to receive user input selecting a mode among a plurality of modes, the selected mode indicating a preset number of colors to be obtained of a preview image and a contour detail level to be obtained of the preview image, wherein the contour detail level indicates a precision level of a boundary between one or more objects and a background excluding the one or more objects; and a communicator configured to transmit the selected mode to the first device and to receive the preview image from the first device, wherein a contour of the one or more objects comprised in the preview image is converted, by the first device, into a simplified representation of the contour based on the contour detail level of the selected mode, and wherein colors of the one or more objects comprised in the preview image is converted, by the first device, into the preset number of colors based on the preset number of colors of the selected mode, wherein a contour detail level with respect to a primary object is higher than a contour detail level with respect an object other than the primary object, and wherein a preset number of colors with respect to the primary object is greater than a preset number of colors with respect the object other than the primary object.

13. The second device of claim 12, wherein:

the first device and the second device are mobile devices, one of the first device and the second device are configured to be wearable; and the communicator communicates with the first device using a wireless communication path.

14. The second device of claim 12, wherein the received preview image is uncompressed.

* * * * *